United States Patent [19]
Eichsteadt

[11] Patent Number: 6,060,979
[45] Date of Patent: May 9, 2000

[54] CALL BOX APPARATUS

[76] Inventor: Gary Eichsteadt, 5710 CoCo Palm Dr., Tamarac, Fla. 33319

[21] Appl. No.: 08/835,505

[22] Filed: Apr. 8, 1997

Related U.S. Application Data

[63] Continuation of application No. 08/570,124, Dec. 11, 1995, abandoned.

[51] Int. Cl.[7] ........................................ G08B 25/00
[52] U.S. Cl. .................. 340/287; 340/297; 340/307; 379/37; 379/432; 379/437
[58] Field of Search .............................. 340/286.06, 287, 340/297, 307; 379/37, 45, 58, 59, 424, 438, 432, 437, 420, 422

[56] References Cited

U.S. PATENT DOCUMENTS

| | | | |
|---|---|---|---|
| 3,800,089 | 3/1974 | Reddick | 379/37 |
| 3,939,417 | 2/1976 | Cannalte et al. | 340/505 |
| 4,406,995 | 9/1983 | May | 340/539 |
| 4,817,126 | 3/1989 | Hendershot | 379/58 |
| 5,283,546 | 2/1994 | Scop et al. | 340/287 |
| 5,377,256 | 12/1994 | Franklin et al. | 379/59 |

*Primary Examiner*—Edward Lefkowitz

[57] ABSTRACT

A call box apparatus includes a controller unit, a radio frequency audio transceiver unit controlled by the controller unit, and a sensor assembly connected to the controller unit for controlling operation of the controller unit. A power supply assembly, an audio storage assembly, an output speaker unit, and an input microphone unit are connected to the controller unit. A housing assembly houses the controller unit, the radio frequency audio transceiver unit, the sensor assembly, the power supply assembly, the audio storage assembly, the output speaker unit, and the input microphone unit. The housing assembly includes a hinged door. The housing assembly includes a first housing portion which supports the door, and a second housing portion which supports the first housing portion. The door includes a door lock assembly. The sensor assembly includes an open-door sensor and a key-operated switch assembly. The power supply assembly includes a rechargeable battery. A solar panel assembly and a power supply interface assembly are connected to the rechargeable battery and the solar panel assembly. When the door is opened, an automatic sequence takes place. Power is applied to the radio frequency audio transceiver unit and all logic circuits. The radio transmits an alarm tone (warble) and a voice message identifying the call box apparatus. A second voice message emanates from the output speaker unit to deliver user instructions. At this point, the call box apparatus becomes a two-way radio station.

8 Claims, 5 Drawing Sheets

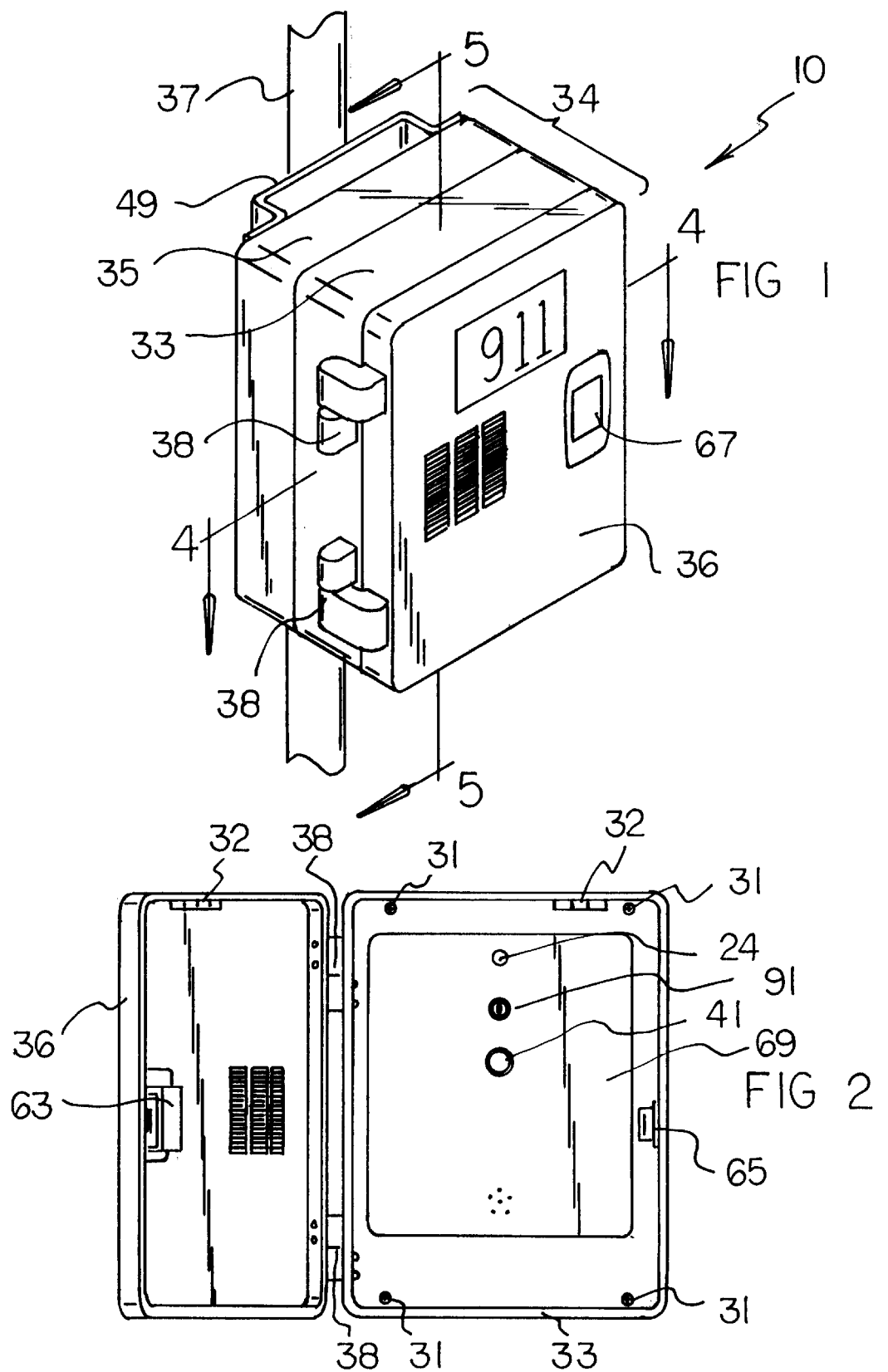

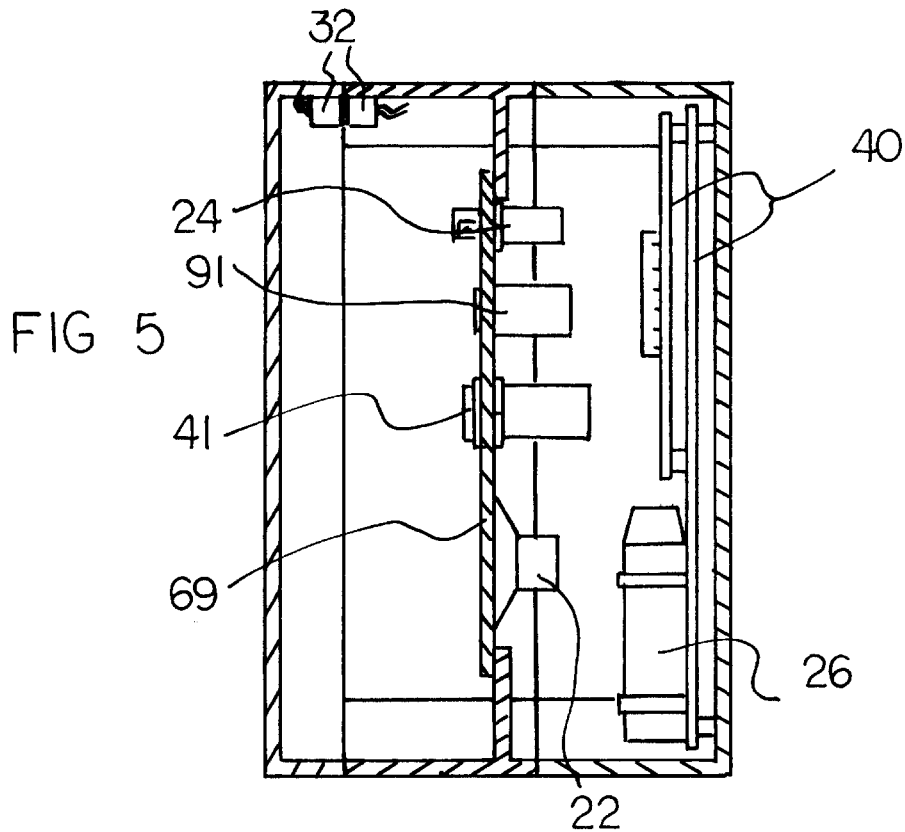
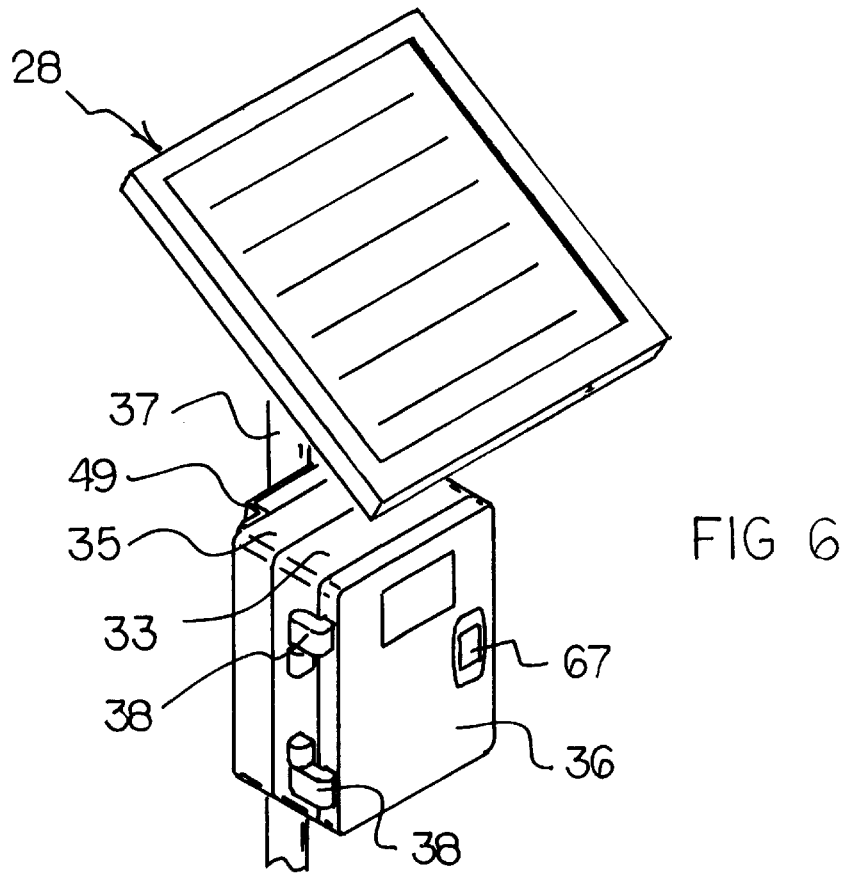

CALL BOX APPARATUS

This application is a continuation of application Ser. No. 08/570,124, filed Dec. 11, 1995, now abandoned.

BACKGROUND OF THE INVENTION

1. Field of the Invention

The present invention relates generally to communication devices and, more particularly, to communication devices which enable a person to send out a communication during an emergency.

2. Description of the Prior Art

Communication devices known as call boxes are placed at predetermined locations in an area. The area in which the call boxes are located may be along a highway, in a city or town, in an industrial site, in a hospital, etc. A common form of communication link between a call box and a central receiving station is a hard wire link. However, a hard wire link is very expensive to install. The real estate in which the hard wire links are present, the material costs of the hard wires, and the installation costs add up to a very large overall cost. In this respect, it would be desirable if a call box system can be provided that does not employ hard wire communication links.

A form of communication link that does not employ hard wires is a radio link. In this respect, it would be desirable if a call box system can be provided which employs radio links. Portable radio transceivers are readily available in the marketplace. In this respect, it would be desirable if a call box system can be provided which employs readily available portable radio transceivers. Portable radio transceivers are battery powered. As a result, batteries must be periodically changed or recharged to assure proper operation of the portable radio transceivers. Yet, it is very labor intensive to have a person visit each call box site either to remove and replace or to recharge depleted batteries. It would be much more economical if each call box had its own dedicated battery recharging system. Just as it is desirable to avoid a hard wire communication link, it is also desirable to avoid a hard wire electrical grid for recharging batteries. In this respect, it would be desirable if a call box system can be provided with a dedicated solar-energy-based battery recharging system for each call box.

Conventional call boxes often have written instructions located inside the box once the box is opened up by a user. However, for users who have poor eyesight, or for dimly lit conditions, the reading and interpretation of written instructions may be very difficult if not impossible. To alleviate such problems, it would be desirable if a call box had audible instructions for guiding a user through use of the call box. For a call box that employs audible instructions, it would be desirable if the call box could be programmed in its audible instructions in any desirable way. For example, one call box may be programmed in one spoken language, and another call box may be programmed in another language.

There are persons in society at large who are not able to talk. There are other persons who are not able to use their hands. Yet, an emergency call box should be usable even by persons who are not able to talk and who are not able to use their hands.

When a hard wired call box system is used, a designated person or person may be on duty for answering call-box calls. Similarly, for a call box system which employs portable radio transceivers, a designated person or persons may be on duty for answering call-box calls. Yet if the designated person or persons are very busy, the caller at the call box may have to wait, and precious time may be lost in an emergency situation. In this respect, it would be desirable if a call box system can be provided in which each call box broadcasts an emergency signal that can be monitored by a large number of persons. For example, citizens band radio has an emergency channel that has a plurality of listeners at any given time. In this respect, it would be desirable if a call box system can be provided which generates a radio broadcast on an emergency radio channel that at any given time usually has a plurality of listeners.

Thus, while it is well known to use call box systems, a call box system has not been provided which has the following combination of desirable features: (1) does not employ hard wire communication links; (2) employs radio links; (3) employs readily available portable radio transceivers; (4) has a dedicated solar-energy-based battery recharging system for each call box, (5) has audible instructions for guiding a user on what to do to use a call box, (6) can be programmed to provide a wide variety of audible messages or instructions; (7) is usable by persons who are not able to talk and who are not able to use their hands; and (8) can generate an audible radio broadcast on an emergency radio channel that ordinarily has a plurality of listeners. The foregoing desired characteristics are provided by the unique call box apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a call box apparatus which includes a controller unit, a radio frequency audio transceiver unit controlled by the controller unit, and a sensor assembly connected to the controller unit for controlling operation of the controller unit. A power supply assembly, an audio storage assembly, an output speaker unit, and an input microphone unit are connected to the controller unit.

A housing assembly houses the controller unit, the radio frequency audio transceiver unit, the sensor assembly, the power supply assembly, the audio storage assembly, the output speaker unit, and the input microphone unit. The housing assembly includes a hinged door. The housing assembly includes a first housing portion which supports the door, and a second housing portion which supports the first housing portion. The door includes a door lock assembly which includes a door-mounted lock portion and a latch portion mounted on the first housing portion. The door-mounted lock portion of the door lock assembly includes a push-button release.

The sensor assembly includes an open-door sensor and a key-operated switch assembly. A logic board, housed with the housing assembly, supports the controller unit, a connector for connecting the radio frequency audio transceiver unit to the controller unit, a connector for connecting the open-door sensor to the controller unit, a connector for connecting the controller unit to the radio frequency audio transceiver unit, the audio storage assembly, a connector for connecting the controller unit to the output speaker unit, and a connector for connecting the controller unit to the input microphone unit.

The power supply assembly includes a rechargeable battery. A solar panel assembly and a power supply interface assembly are connected to the rechargeable battery and the solar panel assembly.

The logic board further supports a connector for connecting the controller unit to the solar panel assembly, a variable resistor for controlling audio volume from the radio frequency audio transceiver unit to the output speaker unit, a variable resistor for controlling audio volume from the audio storage assembly to the output speaker unit, a variable resistor for regulating voltage received by the radio frequency audio transceiver unit, a variable resistor for controlling gain for the input microphone unit, a connector for connecting the input microphone unit to the controller unit, and a variable resistor for controlling voltage applied to the rechargeable battery. The logic board further supports a signal lamp for indicating that the radio frequency audio transceiver unit is transmitting and a signal lamp for indicating that the door is open.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved call box apparatus which has all of the advantages of the prior art and none of the disadvantages.

It is another object of the present invention to provide a new and improved call box apparatus which may be easily and efficiently manufactured and marketed.

It is a further object of the present invention to provide a new and improved call box apparatus which is of durable and reliable construction.

An even further object of the present invention is to provide a new and improved call box apparatus which is susceptible of a low cost of manufacture with regard to both materials and labor, and which accordingly is then susceptible of low prices of sale to the consuming public, thereby making such call box apparatus available to the buying public.

Still yet a further object of the present invention is to provide a new and improved call box apparatus which does not employ hard wire communication links.

Still another object of the present invention is to provide a new and improved call box apparatus that employs radio links.

Yet another object of the present invention is to provide a new and improved call box apparatus which employs readily available portable radio transceivers.

Even another object of the present invention is to provide a new and improved call box apparatus that has a dedicated solar-energy-based battery recharging system for each call box.

Still a further object of the present invention is to provide a new and improved call box apparatus which has audible instructions for guiding a user on what to do to use a call box.

Yet another object of the present invention is to provide a new and improved call box apparatus that can be programmed to provide a wide variety of audible messages or instructions.

Still another object of the present invention is to provide a new and improved call box apparatus which is usable by persons who are not able to talk and who are not able to use their hands.

Yet another object of the present invention is to provide a new and improved call box apparatus that can generate an audible radio broadcast on an emergency radio channel that ordinarily has a plurality of listeners.

These together with still other objects of the invention, along with the various features of novelty which characterize the invention, are pointed out with particularity in the claims annexed to and forming a part of this disclosure. For better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first embodiment of the call box apparatus of the invention, with its door closed, installed on a support mast.

FIG. 2 is a front view of the embodiment of the call box apparatus shown in FIG. 1 with its door open.

FIG. 5 is a cross-sectional view of the embodiment of the invention shown in FIG. 1 taken along line 5—5.

FIG. 6 is a perspective view of a second embodiment of the call box apparatus of the invention which includes a dedicated solar-energy-based battery recharging system.

DESCRIPTION OF THE PREFERRED EMBODIMENT

Figure 3:
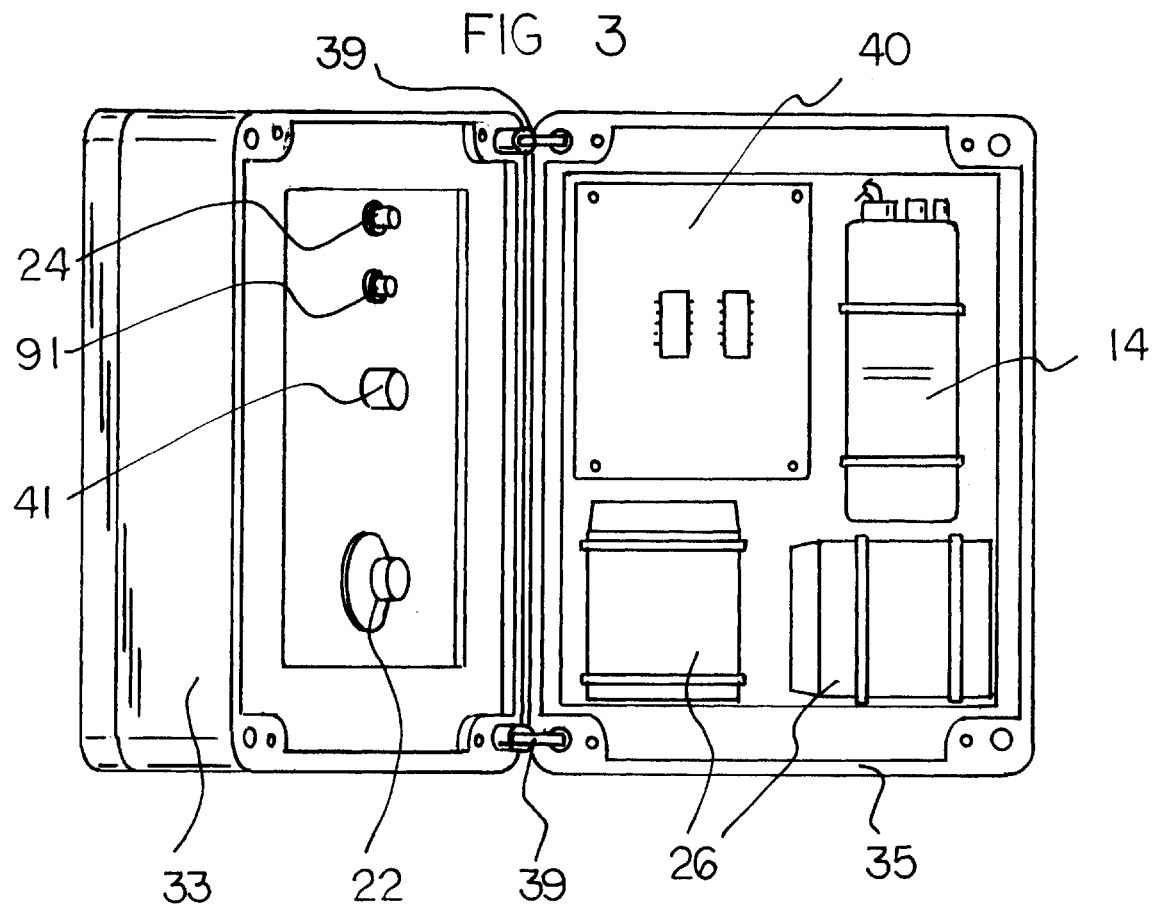
FIG. 3 is an enlarged front view of the embodiment of the call box apparatus of FIG. 2 with a first circuitry housing portion rotated upward to expose a back side of the first circuitry housing portion and a front side of a second circuitry housing portion.
Figure 4:
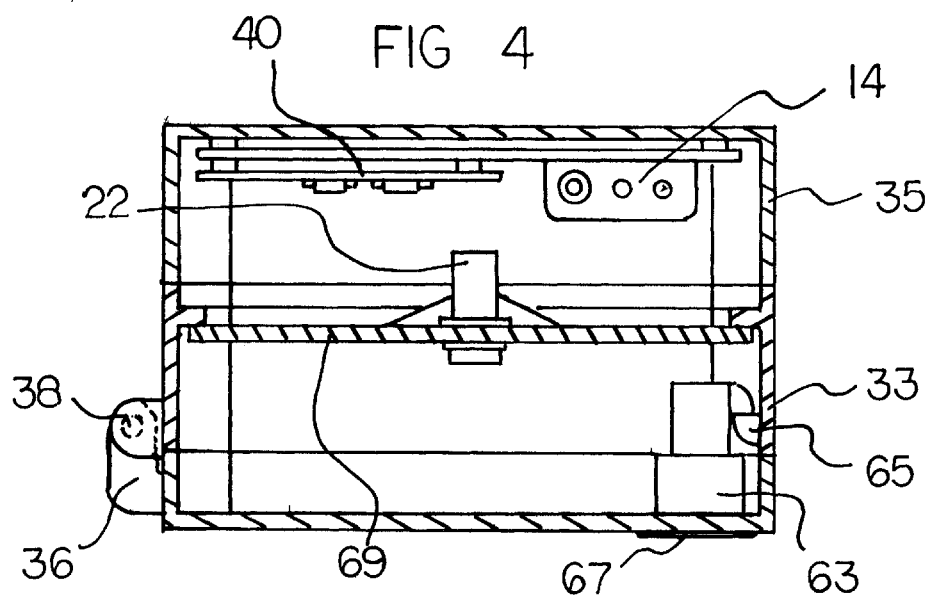
FIG. 4 is a cross-sectional view of the embodiment of the invention shown in FIG. 1 taken along line 4—4 thereof.
Figure 7:
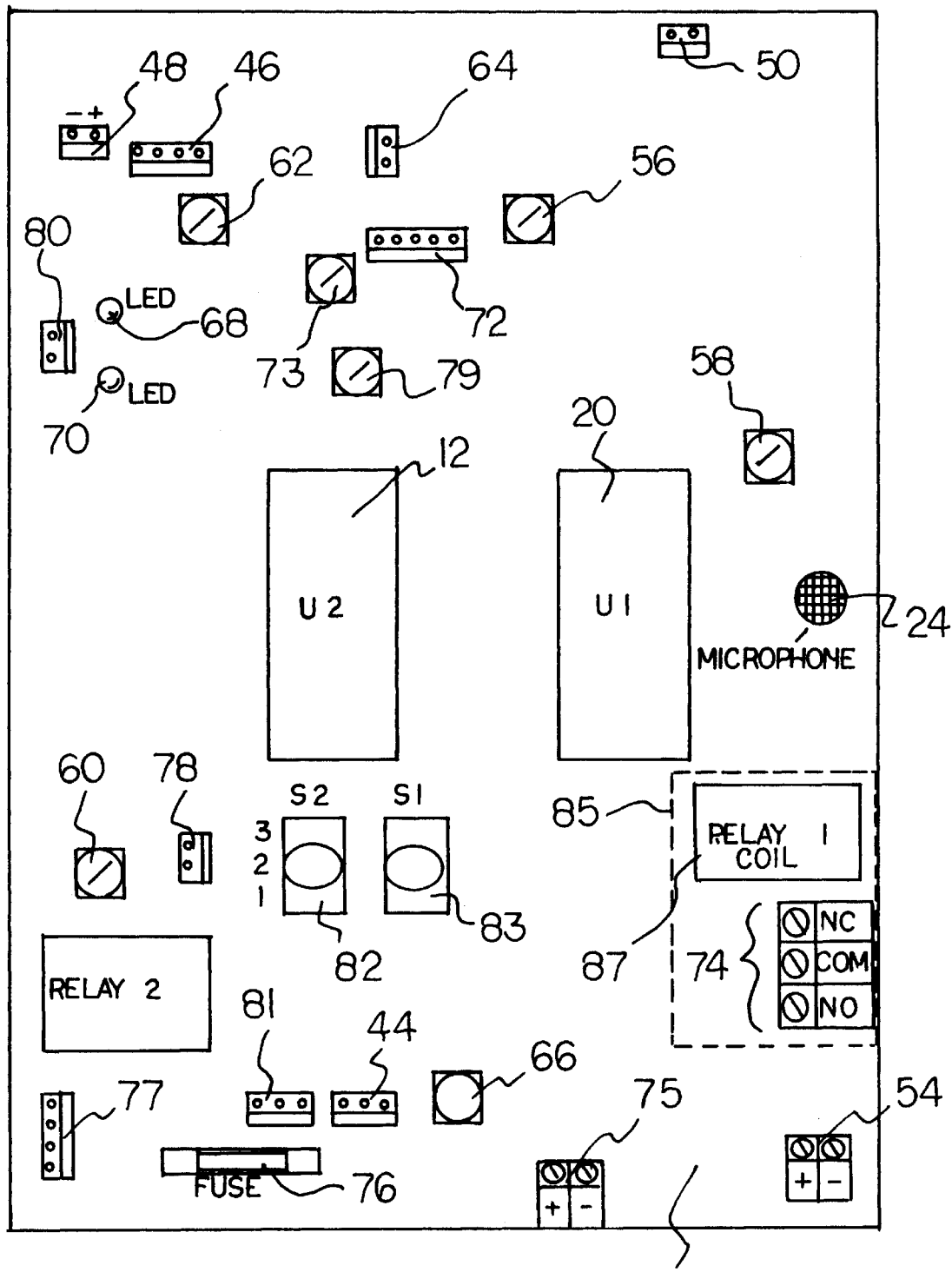
FIG. 7 is a logic board diagram for both the first and second embodiments of the invention.
Figure 8:
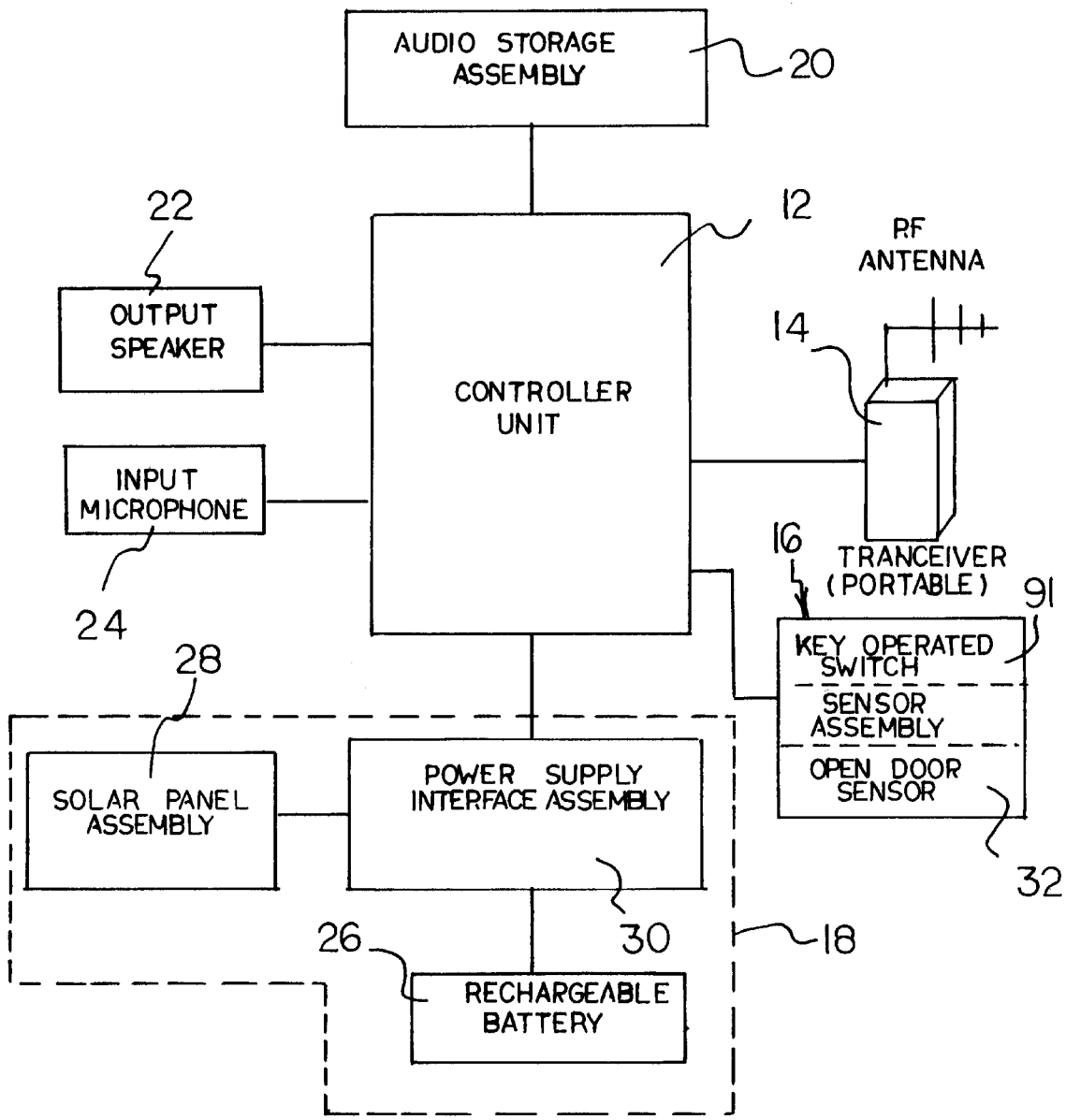
FIG. 8 is a block diagram of the major functional components of both the first and second embodiments of the call box apparatus of the invention.

With reference to the drawings, a new and improved call box apparatus embodying the principles and concepts of the present invention will be described.

Turning to FIGS. 1–5, there is shown a first embodiment of the call box apparatus of the invention generally designated by reference numeral 10. FIGS. 7–10 also apply to the first embodiment of the invention. In the first embodiment, call box apparatus 10 includes a controller unit 12, a radio frequency audio transceiver unit 14 controlled by the controller unit 12, and a sensor assembly 16 connected to the controller unit 12 for controlling operation of the controller unit 12. A power supply assembly 18, an audio storage assembly 20, an output speaker unit 22, and an input microphone unit 24 are connected to the controller unit 12. Generally speaking, the controller unit 12 directs flow of power, signals, and information to and from the other electrical assemblies and units in the call box apparatus 10.

A housing assembly 34 houses the controller unit 12, the radio frequency audio transceiver unit 14, the sensor assembly 16, the power supply assembly 18, the audio storage assembly 20, the output speaker unit 22, and the input microphone unit 24.

The housing assembly 34 includes a hinged door 36. Hinges 38 secure the door 36 to the remainder of the housing assembly 34. The housing assembly 34 includes a first housing portion 33 which supports the door 36, and a second housing portion 35 which supports the first housing portion 33. The second housing portion 35 is supported by the mast 37 by a support bracket 49. The door 36 includes a door lock assembly which includes a door-mounted lock portion 63 and a latch portion 65 mounted on the first housing portion 33. The door-mounted lock portion 63 of the door lock assembly includes a push-button release 67.

The sensor assembly 16 includes an open-door sensor 32 and a key-operated switch assembly 91. A logic board 40, housed with the housing assembly 34, supports the controller unit 12, a connector 46 for connecting the radio frequency audio transceiver unit 14 to the controller unit 12, a connector 44 for connecting the open-door sensor 32 to the controller unit 12, a connector 48 for connecting the controller unit 12 to the radio frequency audio transceiver unit 14, the audio storage assembly 20, a connector 50 for connecting the controller unit 12 to the output speaker unit 22, and a connector 52 for connecting the controller unit 12 to the input microphone unit 24.

With respect to the second embodiment of the invention disclosed in FIG. 6, the power supply assembly 18 includes a rechargeable battery 26. A solar panel assembly 28 and a power supply interface assembly 30 are connected to the rechargeable battery 26 and the solar panel assembly 28. During the daytime, the solar panel assembly 28 recharges the rechargeable battery 26 by way of the power supply interface assembly 30. Also, during the daytime, power flows from both the rechargeable battery 26 and the solar panel assembly 28 to the controller unit 12. At night, power flows from the rechargeable battery 26, through the power supply interface assembly 30, to the controller unit 12. Two rechargeable batteries 26 are shown in FIG. 3. The circuitry shown in FIGS. 7–10 also applies to the second embodiment of the invention.

The logic board 40 further supports a connector 54 for connecting the controller unit 12 to the solar panel assembly 28, a variable resistor 56 for controlling audio volume from the radio frequency audio transceiver unit 14 to the output speaker unit 22, a variable resistor 58 for controlling audio volume from the audio storage assembly 20 to the output speaker unit 22, a variable resistor 60 for regulating voltage received by the radio frequency audio transceiver unit 14, a variable resistor 62 for controlling gain for the input microphone unit 24, a connector 64 for connecting the input microphone unit 24 to the controller unit 12, and a variable resistor 66 for controlling voltage applied to the rechargeable battery 26. The logic board 40 further supports a signal lamp 68 for indicating that the radio frequency audio transceiver unit 14 is transmitting and a signal lamp 70 for indicating that the door 36 is open.

The logic board 40 also supports an ANI connector 72, a variable resistor 73 for controlling ANI TX audio, a connector array 74 for connecting switched output, a connector 75 for connecting to an alternative voltage source, a fuse 76, a connector 77 for a key switch, a connector 78 for a panel PTT, a variable resistor 79 for controlling message TX audio, a connector 80 for a panel light, a connector 81 for an auxiliary sensor for causing activation of the radio frequency audio transceiver unit 14, a message select switch 82, and a record/play switch 83.

It is noted that the number "3" position of the message select switch 82 provides instructions; the number "2" position, an ID message; and the number "1", an auxiliary message.

In using the call box apparatus 10, when the door 36 is closed and the door lock assembly is latched, DC battery drain to the radio frequency audio transceiver unit 14, the signal lamps 68 and 70, and the logic board 40 is shut off with the exception of the memory and microprocessor "keep alive" circuits. Keeping the entire unit in the "sleep mode" allows an operational life of almost two months to the batteries without recharging. This is especially important for an apparatus that does not employ a solar panel assembly 28. It is noted that the normal battery is removed from the radio frequency audio transceiver unit 14, and the radio frequency audio transceiver unit 14 operates from the rechargeable batteries 26 which are heavy duty lead/acid gel cells. These cells are better suited for use as a "float" cell than Nickel-Cadmium portable radio batteries. This is an important consideration when "float-charging" the call box apparatus 10 with the optional solar panel assembly 28 or AC line charger.

When the door 36 is opened, an automatic sequence follows. Power is applied to the radio frequency audio transceiver unit 14, signal lamps 68 and 70, and all logic circuits. The radio frequency audio transceiver unit 14 transmits an alarm tone (warble) and a voice message identifying the call box apparatus 10. A second voice message emanates from the output speaker unit 22 to deliver user instructions. At this point, the call box apparatus 10 becomes a two-way radio station, and the user may talk directly to a security guard, police officer, dispatcher, or other aiding agency simply by pressing the single large red press-to-talk (PTT) button 41 on the mounting panel 69. Upon releasing the press-to-talk (PTT) button 41, the user hears any radio message directed to the call box apparatus 10. A third voice message may be transmitted in the event a shock sensor (or other device) senses that someone may be tampering with the unit. Each of the three available voice messages is stored in a digital voice-storage module and may be edited or changed in the field by any using agency.

More specifically, in using the call box apparatus 10 of the invention, the radio frequency audio transceiver unit 14 can be a conventional or trunked portable radio frequency audio transceiver unit 14 for transmitting an alarm tone and a user-programmed first voice message, stored in the audio storage assembly 20, to a remote location on a conventional or trunked, simplex or repeater-based radio channel. After the transmission of the first message, a second voice message is played from the audio storage assembly 20. The second message is generated through the output speaker unit 22 so that it can be heard at the call box apparatus 10 so that the person using the call box apparatus 10 can hear the second message. The second message can be "Press and hold the button to talk. Release the button to listen. Please speak clearly." When the door 36 is opened, the open-door sensor 32 triggers the transmission of the alarm and first voice message. Because the radio frequency audio transceiver unit 14 installed in the call box apparatus 10 can be a substantially conventional portable transceiver, it functions as a two-way radio station allowing an officer or security guard to speak directly with the user of the call box apparatus 10 to determine the nature of the emergency.

Access to the logic board 40 is obtained by removing four screws 31 shown in FIG. 2. The removal of the screws 31 permits the first housing portion 33 to be swung around locating pins 39 is connected between the first housing portion 33 and the second housing portion 35. It is important that the first housing portion 33 not be allowed to swing freely on the locating pins 39 because the locating pins 39 are not strongly secured to the first housing portion 33 and the second housing portion 35. The first housing portion 33 should be supported carefully as it is opened with respect to the second housing portion 35.

The call box apparatus 10 of the invention can be installed either indoors or outdoors. Using support bracket 49 the call box apparatus 10 is installed on the mast 37. Other types of support brackets can be used to support the call box apparatus 10 on a wall. With an outdoor installation, the solar panel assembly 28 is also mounted on the mast 37. To prevent vandalism, all power and antenna cables should run inside the mast 37 and be lead into the housing assembly 34 through a "knock-out" aperture located in the center of the rear wall of the second housing portion 35. A "close nipple" is recommended to protect any wiring running between the housing assembly 34 and a hollow, vertical mast 37. It will be necessary to drill an access hole for this nipple through the vertical mast 37. A second "knock-out" aperture is located in the center of a bottom wall in the housing assembly 34 for conduit or cable connection.

The recorded messages in the audio storage assembly 20 are arranged as follows. About 2 seconds after opening the door 36, the radio frequency audio transceiver unit 14 automatically transmits an alert tone followed by the "ID MESSAGE" (Message No. 2). At the end of the "ID MESSAGE", the call box apparatus 10 automatically transmits "INSTRUCTIONS" (Message No. 1) via the output speaker unit 22. Following the "INSTRUCTIONS" message, the radio press-to-talk (PTT) button 41 is pressed allowing direct radio communication with a security agency.

The audio storage assembly 20 can be implemented in a number of ways. For example, digital voice-storage modules can be employed. The digital voice-storage modules can hold three messages (20 seconds total). The messages can be recorded as desired. To change a recorded message, the following procedure is followed. The door 36 is opened and the first housing portion 33 is rotated open to gain access to the logic board 40. The message select switch 82 and the record/play switch 83 are located. The desired switch position in the message select switch 82 is selected. While holding the record/play switch 83 in the "RECORD" position, the new message is spoken into the logic board 40 using a normal, conversational voice level. One should not shout. The input microphone unit 24 is very sensitive. After recording the new message, the record/play switch 83 is moved to the "PLAY" position. All messages are changed by following the above procedure with particular attention paid to the position of the message select switch 82.

A number of audio and voltage levels can be adjusted by of variable resistor controls (potentiometers) on the logic board 40. These controls can be set at a factory to match the characteristics of the radio frequency audio transceiver unit 14 in the call box apparatus 10. These factory settings need not be changed unless significant repairs are made to components in the call box apparatus 10. If a different radio frequency audio transceiver unit 14 is substituted for an original radio frequency audio transceiver unit 14, the factory settings may have to be changed. Most precise adjustments to the call box apparatus 10 require complex test equipment such as a radio service monitor or similar unit capable of measuring FM power, frequency and deviation levels to the accuracy required to comply with FCC Rules and Regulations. A radio frequency audio transceiver unit 14 can be installed in the housing assembly 34 using any suitable tying device such as a "tie wrap". The antenna cable and the radio-accessory cable may need to be attached before fastening the radio frequency audio transceiver unit 14 in position. The radio power cable is not is connected to the logic board 40 until all other mechanical and electrical connections have been completed and leads dressed so as to allow suitable clearance when the door is closed and the battery or AC power connected.

The radio voltage regulator can be adjusted as follows. Before turning on the radio frequency audio transceiver unit 14, the voltage appearing at the connector 48 for "RADIO POWER" is measured. The voltage is adjusted by turning the variable resistor 60 for radio voltage regulation to obtain the correct voltage for the radio in use. Next, the radio is turned on, and the adjustment is repeated.

Optionally, an AC power adapter can be used for powering the call box apparatus 10 from a 120 VAC source. Then, the direct current voltage appearing at the connector 75 for the "SWITCHED 13.8 VDC" is measured. To adjust this voltage, the variable resistor 66 for the "13.8 VDC BATT. CHG. ADJUST" is adjusted to obtain a DC voltage equal to the DC voltage provided by a fully charged rechargeable battery 26.

To control the audio level from the output speaker unit 22, the following steps are taken. A radio antenna (not shown) is connected to a 50 ohm dummy load. The radio frequency audio transceiver unit 14 is turned on, and the variable resistor 56 for "RADIO AUDIO TO SPEAKER" is adjusted to the low end of the control range. Using a service monitor tuned to the receiver frequency. A 1 KHz signal is generated has a 4 KHz deviation. Variable resistor 56 for "RADIO AUDIO TO SPEAKER" is adjusted to obtain the best sounding audio from the output speaker unit 22. Using a portable radio, voice quality is tested as described above, and the variable resistor 56 for the "RADIO AUDIO TO SPEAKER" is adjusted for clearest transmission.

To adjust audio level of the output speaker unit 22 when playing a message from the audio storage assembly 20, a particular message is selected by employing the message select switch 82. While holding the record/play switch 83 in the "PLAY" position, the variable resistor 58 for the "MESSAGE AUDIO TO SPEAKER" is adjusted to obtain the desired audio level in the output speaker unit 22.

To adjust the input microphone unit 24, a service monitor is set to receive radio transmission from the call box apparatus 10. The press-to-talk (PTT) button 41 is pressed, and the variable resistor 62 for "MICROPHONE GAIN" is adjusted to obtain the FCC-authorized deviation as displayed on the monitor.

To transmit message audio, the service monitor is set to receive radio transmissions from the call box apparatus 10. The door 36 of the call box apparatus 10 is closed, and 5 seconds are permitted to elapse. The door 36 is then opened to initiate automatic message transmission. The monitor display is observed, and the variable resistor 79 for "MESSAGE TX AUDIO" is adjusted during play of the message to obtain the FCC-authorized deviation.

To obtain an optional ANI audio transmission, an optional ANI Encoder Module (not shown) is installed on the logic board 40 at connector 72. The ANI Encoder Module creates a coded signal of short duration that is transmitted before the ID message is transmitted. The following steps are taken to adjust the modulation level of the ANI transmission. A service monitor is set to receive transmissions from the call box apparatus 10. The door 36 is closed and 5 seconds are permitted to elapse. The door 36 is opened, and automatic message transmission is initiated. The monitor display is observed, and variable resistor 73 for "ANI TX AUDIO" is adjusted to obtain FCC-authorized deviation. Because of the very short duration of the ANI transmission, it may be necessary to repeat the procedure several times to obtain the proper level setting.

The call box apparatus 10 can also be equipped to provide auxiliary outputs that may be used to control a variety of external functions. More specifically, a relay 85 includes a relay coil 87 which controls the connector array 74. More specifically, the connector array 74 includes a SPDT switch arrangement. The relay 85 is rated at 120 VAC, 5 amperes, non-inductive.

The input microphone unit 24, the key-operated switch assembly 91, the press-to-talk (PTT) button 41, and the output speaker unit 22 are all mounted on a common mounting panel 69.

Plugs, connectors, cables, and variable resistors used in the call box apparatus 10 are, for the most part, off-the-shelf items readily available through electronics suppliers. For greater reliability, crimp-style connections may be used in place of soldered connections.

Numerous optional features are available for use with the call box apparatus 10 of the invention. For example, there can be provided keychain and pendant alarm transmitters, a silent vandalism alarm, flashing strobe alerts, and ANI equipment for automatic ID, recording, and test functions. It is noted that if an optional vandalism alarm is installed, when the press-to-talk (PTT) button 41 is pressed, an auxiliary message (Message No. 3) will be transmitted by the radio frequency audio transceiver unit 14.

The components of the call box apparatus of the invention can be made from inexpensive and durable electronic components. In addition, inexpensive metal and plastic materials can also be employed.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved call box apparatus that is low in cost, relatively simple in design and operation, and which may advantageously be used without employing hard wire communication links. With the invention, a call box apparatus is provided which employs radio links. With the invention, a call box apparatus is provided which employs readily available portable radio transceivers. With the invention, a call box apparatus is provided which has a dedicated solar-energy-based battery recharging system for each call box. With the invention, a call box apparatus is provided which has audible instructions for guiding a user on what to do to use a call box. With the invention, a call box apparatus is provided which can be programmed to provide a wide variety of audible messages or instructions. With the invention, a call box apparatus is provided which is usable by persons who are not able to talk and who are not able to use their hands. With the invention, a call box apparatus is provided which can generate an audible radio broadcast on an emergency radio channel that ordinarily has a plurality of listeners.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A call box apparatus, comprising:
   a controller unit;
   a radio frequency audio transceiver unit positioned in electrical communication with and controlled by said controller unit;
   a sensor assembly connected to said controller unit for controlling operation of said controller unit;
   a power supply assembly connected to said controller unit;
   an output speaker unit connected to said controller unit;
   an input microphone unit connected to said controller unit;
   an audio storage assembly connected to said controller unit, said audio storage assembly including a first voice message, the audio storage assembly being positioned in electrical communication with said radio frequency audio transceiver unit;
   wherein said first voice message is automatically transmitted by said radio frequency audio transceiver unit when said sensor assembly is actuated; and said audio storage assembly includes a second voice message, wherein said second voice message is automatically generated through said output speaker unit after said first voice message is transmitted by said radio frequency audio transceiver unit.

2. The of call box apparatus of claim 1, wherein said first voice message comprises a call box identification message.

3. The of call box apparatus of claim 1, wherein said second voice message comprises user instructions.

4. The of call box apparatus of claim 3, wherein said user instructions comprise: "Press and hold the button to talk, release the button to listen, please speak clearly."

5. The of call box apparatus of claim 1, and further comprising a tampering sensor positioned in electrical communication with said controller, wherein said audio storage assembly includes a third voice message, wherein said third voice message is automatically transmitted by said radio frequency audio transceiver unit upon actuation of said tampering sensor.

6. A call box apparatus, comprising:

a controller unit;

a radio frequency audio transceiver unit positioned in electrical communication with and controlled by said controller unit;

a sensor assembly connected to said controller unit for controlling operation of said controller unit;

a power supply assembly connected to said controller unit;

an output speaker unit connected to said controller unit;

an input microphone unit connected to said controller unit;

an audio storage assembly connected to said controller unit, said audio storage assembly including a first voice message, the audio storage assembly being positioned in electrical communication with said radio frequency audio transceiver unit;

wherein said first voice message is automatically transmitted by said radio frequency audio transceiver unit when said sensor assembly is actuated;

a door normally maintaining said controller unit sealed and adapted to be opened to permit access to said controller unit in said open condition, said door being operatively coupled to said sensor assembly such that opening of said door is effective to activate said audio storage assembly and automatically transmit said first voice message.

7. The call box apparatus of claim 6, wherein said first voice message comprises a call box identification message.

8. The call box apparatus of claim 6, further including alarm circuit means, said alarm circuit means being operatively coupled to said sensor assembly such that opening of said door is effective to cause said alarm circuit means to transmit an alarm to a remote location.

* * * * *